United States Patent
Suchalla et al.

(10) Patent No.: US 9,595,405 B2
(45) Date of Patent: Mar. 14, 2017

(54) CIRCUIT BREAKER COMPRISING AT LEAST ONE CONTACT FOR TAPPING A VOLTAGE

(71) Applicant: EATON ELECTRICAL IP GMBH & CO. KG, Schönefeld (DE)

(72) Inventors: Marc Suchalla, Duisburg (DE); Kurt Tanda, Leverkusen (DE); Ireneusz Scislak, Cologne (DE); Thomas Freyermuth, Kalenborn (DE); Rainer Schmidt, Sankt Augustin (DE); Alexander Zumbeck, Bornheim (DE); Georg Reidt, Swisstal (DE)

(73) Assignee: EATON ELECTRICAL IP GMBH & CO. KG, Schoenefeld (DE)

( * ) Notice: Subject to any disclaimer, the term of this patent is extended or adjusted under 35 U.S.C. 154(b) by 174 days.

(21) Appl. No.: 14/355,233

(22) PCT Filed: Nov. 2, 2012

(86) PCT No.: PCT/EP2012/071720
§ 371 (c)(1),
(2) Date: Apr. 30, 2014

(87) PCT Pub. No.: WO2013/064631
PCT Pub. Date: May 10, 2013

(65) Prior Publication Data
US 2014/0328034 A1    Nov. 6, 2014

(30) Foreign Application Priority Data
Nov. 2, 2011 (EP) ...................... 11187495

(51) Int. Cl.
| | | |
|---|---|---|
| H02B 1/04 | (2006.01) |
| H01H 9/02 | (2006.01) |
| H01H 71/12 | (2006.01) |
| H01H 71/74 | (2006.01) |
| H01H 73/20 | (2006.01) |
| H01H 9/54 | (2006.01) |
| H01H 47/00 | (2006.01) |

(52) U.S. Cl.
CPC ............ *H01H 9/0271* (2013.01); *H01H 9/54* (2013.01); *H01H 71/123* (2013.01); *H01H 71/7409* (2013.01); *H01H 73/20* (2013.01); *H02B 1/04* (2013.01); *H01H 47/002* (2013.01)

(58) Field of Classification Search
None
See application file for complete search history.

(56) References Cited

U.S. PATENT DOCUMENTS 5,946,179 A * 8/1999 Fleege ................. G01R 31/025
                                              361/42
2003/0048589 A1* 3/2003 Tignor ................... H02H 3/006
                                              361/93.3

(Continued)

FOREIGN PATENT DOCUMENTS

| EP | 2079091 A1 | 7/2009 |
| FR | 2794281 A1 | 12/2000 |
| WO | WO 2008034395 A1 | 3/2008 |

*Primary Examiner* — Courtney Smith
(74) *Attorney, Agent, or Firm* — Leydig, Voit & Mayer, Ltd.

(57) ABSTRACT

A circuit breaker baying a switch housing and at least one contact for tapping a voltage on a primary conductor.

9 Claims, 5 Drawing Sheets

(56) References Cited

U.S. PATENT DOCUMENTS

2009/0190289 A1* 7/2009 Bellotto ............ H01H 71/7409
  361/620
2009/0325423 A1* 12/2009 Bollinger ............ H01H 50/021
  439/638

* cited by examiner

CIRCUIT BREAKER COMPRISING AT LEAST ONE CONTACT FOR TAPPING A VOLTAGE

CROSS-REFERENCE TO RELATED APPLICATIONS

This application is a U.S. National Phase Application under 35 U.S.C. §371 of International Application No. PCT/EP2012/071720 filed on Nov. 2, 2012, and claims benefit to European Patent Application No. EP 11187495.4 filed on Nov. 2, 2011. The International Application was published in German on May 10, 2013, as WO 2013/064631 A1 under PCT Article 21(2).

FIELD

The invention relates to a circuit breaker having a circuit-breaker housing and comprising at least one contact for tapping a voltage from a primary conductor.

BACKGROUND

A voltage tap is needed for an energy measurement on a circuit breaker, for instance for analysing the energy consumption. Until now, an external apparatus outside the circuit breaker has been used for this purpose. In order to be able to perform the energy measurement inside the circuit breaker itself, an internal voltage tap is also needed inside the circuit breaker. US 2009/0190289 A1 discloses a circuit breaker in which a voltage tap is integrated in the circuit breaker itself so that an external module can be dispensed with. The tap for such a high voltage as applied to a primary conductor of a circuit breaker requires the use of voltage dividers to reduce the voltage to a level that is tolerated by an electronic measuring circuit. Routing the high-voltage signal via conductor tracks, wires, adapters and contacts can result in soiling, high temperatures, possible leakage paths and interference to the electronics by electrical or electromagnetic effects. Under these circumstances, it is a problem to create sufficient space in a circuit-breaker housing for the additional elements that are required, and to guarantee reliable contact is made with the primary conductor.

SUMMARY

An aspect of the invention provides a contact-making means that is improved with regard to the stated problems for the internal voltage tap in a circuit breaker.

An aspect of the invention provides a circuit breaker, comprising: a circuit-breaker housing; a contact configured to tap a voltage from a primary conductor; a spring element arranged to contact with the primary conductor; a voltage divider, configured to reduce a tapped voltage from the primary conductor, arranged between the spring element and a switch electronics unit, wherein the voltage divider is arranged on a printed circuit board, wherein the spring element is joined to the printed circuit board, and wherein the printed circuit board is arranged on a side wall of the circuit-breaker housing.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

A circuit breaker according to an aspect of the invention comprises a circuit-breaker housing and at least one contact for tapping a voltage from a primary conductor. The circuit-breaker housing constitutes within the meaning of the invention the outer limit of the circuit breaker and contains all the essential components. Thus the circuit-breaker housing also encompasses a converter housing that may exist separately. At least one spring element is provided according to the invention to make the contact with the primary conductor. The spring element can here be a device supported by spring action or a spring in the sense of an inherently resilient component. In order to make contact, the spring element is either itself electrically conductive or supports an electrically conductive component. One advantage in using a spring element is that it ensures that contact is made with the primary conductor reliably and in a more fault-tolerant manner. A voltage divider for reducing the tapped voltage from the primary conductor is preferably arranged between the spring element and a switch electronics unit.

According to a first preferred embodiment, it is provided that the voltage divider is arranged on a printed circuit board, wherein the spring element is joined to the printed circuit board.

According to a second preferred embodiment, it is provided that the voltage divider is connected to the spring element via a conductor track.

The printed circuit board according to the first embodiment is preferably arranged on the circuit-breaker housing. Particularly preferably, the printed circuit board is arranged in a side wall of the circuit-breaker housing, in particular in that side wall of the circuit-breaker housing through which the primary conductor is fed into the circuit-breaker housing.

Further preferred designs that can be applied to the first and second embodiments provide that the spring element is formed by a coil spring, or that the spring element is formed by a leaf spring, or that the spring element is formed by a spring-loadable telescopic arrangement, in particular is formed by what is known as a spring-loaded contact.

A further preferred design that can be applied to the first and second embodiments consists in the spring element being formed by a plurality of leaf springs in the sense of a spring-loaded comb contact, said leaf springs being arranged in a receiving opening for the primary conductor. The receiving opening for the primary conductor is here arranged in particular in a converter block. A contact between the leaf springs of the spring element and the primary conductor can thus advantageously be made when the primary conductor is fitted.

In a multi-pole circuit breaker, a plurality of primary conductors are preferably assigned a corresponding number of contacts for tapping the voltage. In this case, there are in addition preferably a plurality of printed circuit boards, which are arranged in a shared adapter assembly housing.

The invention is described in greater detail below with reference to embodiments and the drawings. The embodiments are merely by way of example and do not have a limiting effect on the general inventive concept.

Figure 1:
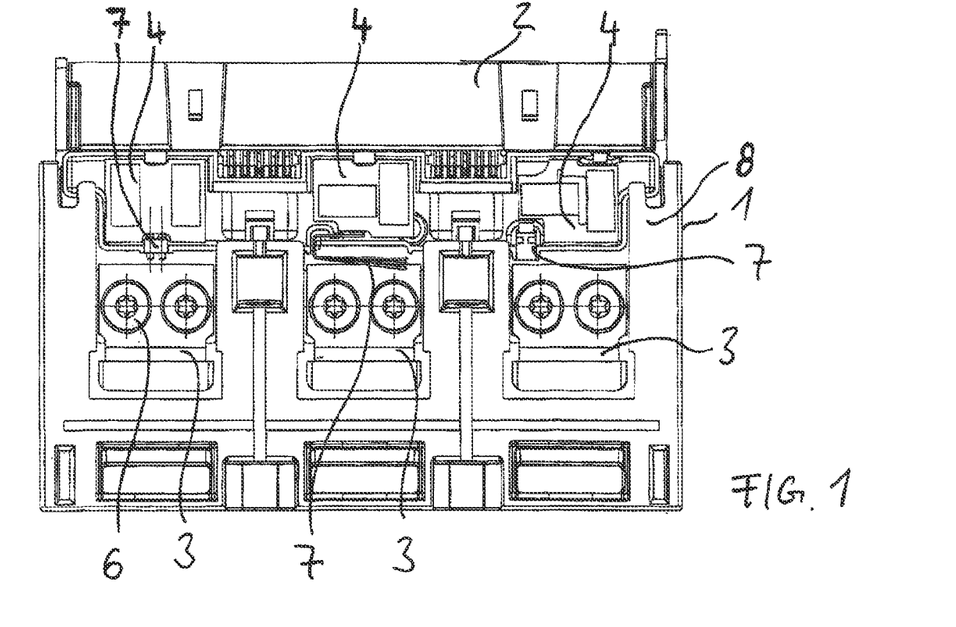
FIG. 1 shows an embodiment of the circuit breaker according to the invention having three different embodiments of a contact element.

FIG. 1 shows a partial view of an embodiment of the circuit breaker according to the invention. It shows the side wall 8 of the circuit-breaker housing 1, through which the primary conductor 3 is fed into the circuit-breaker housing 1, inside of which is located a converter of the circuit breaker. The converter, which in the embodiment shown is arranged inside the housing 1 such that it is not visible, in alternative circuit breaker constructions can have its own converter housing, for instance the converter housing is arranged externally on the actual circuit-breaker housing 1. Again in this case, the converter housing shall be understood to be part of the circuit-breaker housing within the meaning of the invention. Primary conductors 3 lead into the interior of the circuit-breaker housing 1, extend through the converter block and then continue into the actual switching chamber of the circuit breaker. The primary conductors 3 are fastened to the converter by fastening means 6, usually screws. An electronics module 2 is arranged on the converter. The electronic circuits arranged in said module are used to control the circuit breaker on the basis of the signals transferred by the converter.

Figure 2:
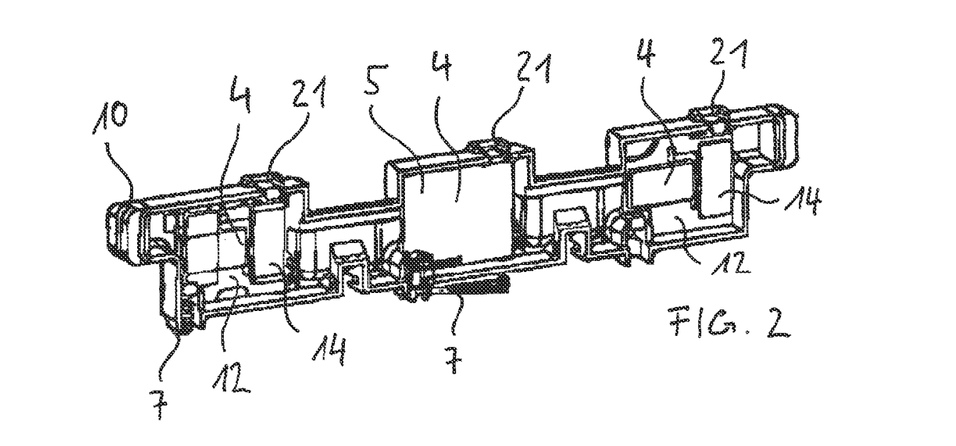
FIG. 2 shows an adapter assembly housing for accommodating the adapters according to FIG. 1.

According to the invention, the circuit breaker comprises at least one contact for tapping a voltage from one of the primary conductors 3. FIG. 2 shows voltage dividers 14 for reducing the tapped voltage from the primary conductor 3, which are connected between the spring elements 7 and the switch electronics unit 2. The voltage dividers 14 are arranged on printed circuit boards 12, wherein the spring elements 7 are joined to the printed circuit boards 12. The printed circuit boards 12, comprising voltage dividers 14, contact terminals for the spring elements 7 and contact terminals 21 for routing a signal to the switch electronics unit 2, form an adapter 4, which can comprise a housing and/or a housing cover 5. In the embodiment, the adapters 4 are accommodated in an adapter assembly housing 10, which is used to insert said adapters into a recess in the side wall 8 of the circuit-breaker housing 1 according to FIG. 1.

Figure 3:
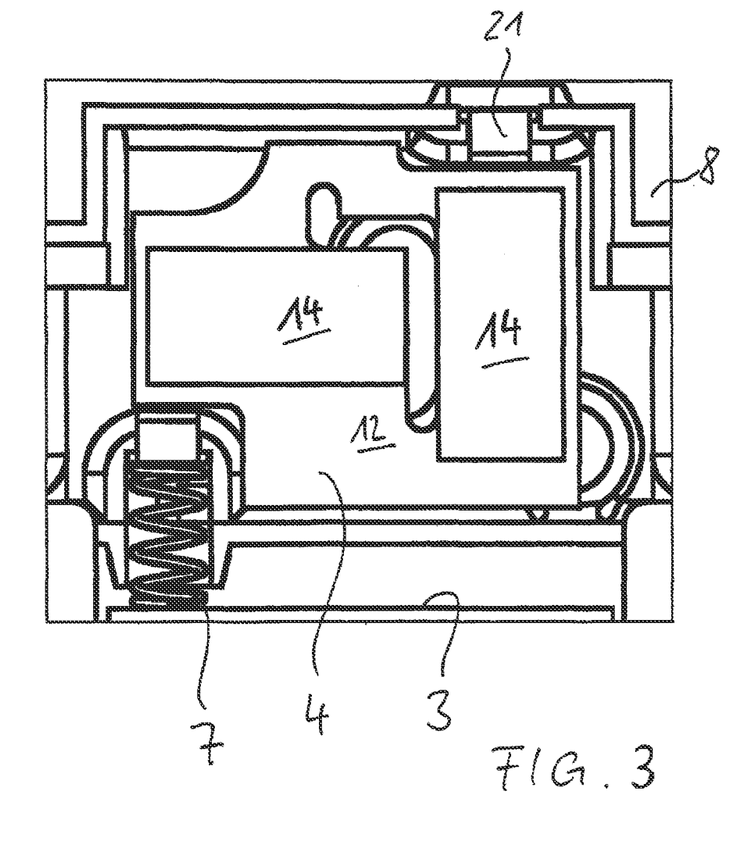
FIG. 3 shows in detail a contact element according to FIG. 1.
Figure 4:
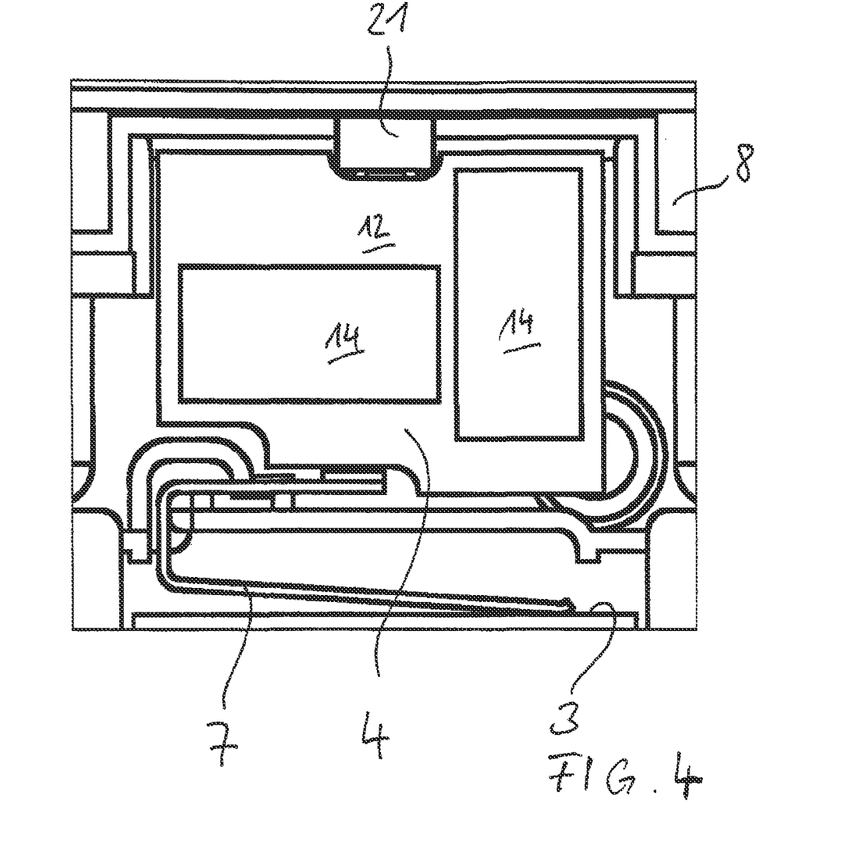
FIG. 4 shows in detail a further contact element according to FIG. 1.
Figure 5:
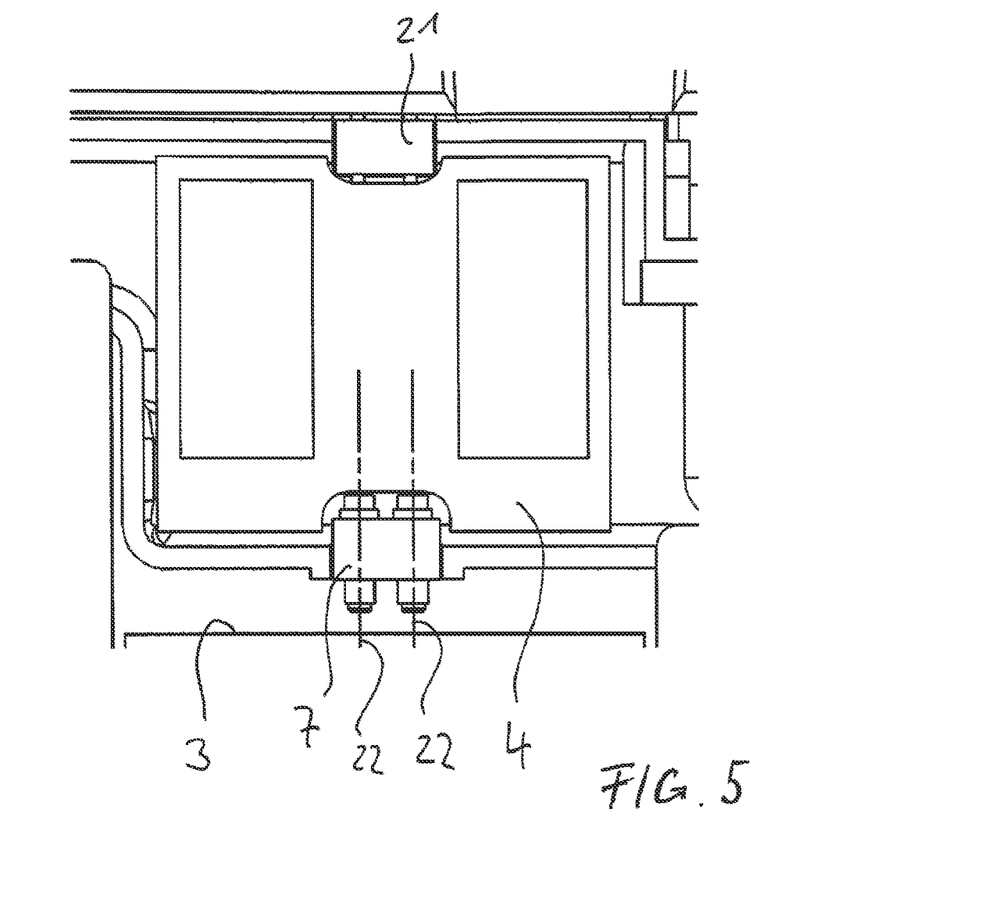
FIG. 5 shows in detail yet another contact element according to FIG. 1.

According to the view in FIG. 1, three adapters 4 comprising printed circuit boards 12 for reducing the tapped voltages of the three primary conductors 3 are provided inside the circuit-breaker housing 1. FIGS. 3, 4 and 5 each show in detail an adapter 4 having a spring element 7. The voltage is reduced by the voltage dividers 14. The resistors provided for this purpose are arranged on the printed circuit boards 12. The adapters 4 are preferably arranged outside the electronics module 2 in order to reduce electrical or electromagnetic effects on the electronics.

The view in FIG. 1 illustrates a variant of the positioning of the adapters 4, which in this case are arranged inside the side wall 8, preferably in a shared adapter assembly housing 10, which is shown separately in FIG. 2. The side wall 8 is shown partially opened up for illustration purposes. This position is particularly advantageous because contact can be made with the primary conductor 1 according to the invention by means of a spring element 7 via the surface of the primary conductor or via fastening means of the primary conductors 3. For this purpose, the side wall 8 can comprise suitable channels or holes between the adapters 4 and the primary conductors 3. In addition, the reduced voltage signal can be routed directly to the electronics module 2, as explained below in connection with FIGS. 3, 4 and 5. The different adapters 4 are used here merely to illustrate possible embodiments of the spring element 7. Normally the same type of adapters 4 are used in one circuit breaker.

FIGS. 3, 4 and 5 each show in detail one of the spring elements 7 according to FIG. 1. The contact elements 7 make contact with the respective primary conductor 3. The figures otherwise, show by way of example, voltage dividers 14 on the respective printed circuit board 12 of the adapters 4.

The contact element 7 according to FIG. 3 comprises a spiral-shaped compression spring which is fastened and connected to the printed circuit board 12 and which is preloaded against the surface of the primary conductor 3 or even against a fastening screw of the primary conductor 3, and which transfers the high voltage from the primary conductor 3 to the adapter 4.

The contact element 7 according to FIG. 4 comprises a leaf spring which is fastened and connected to the printed circuit board 12 and which is preloaded against the surface of the primary conductor 3 or even against a fastening screw of the primary conductor 3, and which transfers the high voltage from the primary conductor 3 to the adapter 4.

The contact element 7 according to FIG. 5 comprises what is known as a spring-loaded contact which is fastened and connected to the printed circuit board 12 and which has two, in particular telescopic, contact pins 22 which are preloaded by spring force against the surface of the primary conductor 3 or even against a fastening screw of the primary conductor 3, and which transfer the high voltage from the primary conductor 3 to the adapter 4. The position of the contact pins 22 is merely indicated by lines.

Comparable contact elements can also be used to transfer the reduced voltage signal to the electronics module 2. The contacts to the electronics module are labelled in FIGS. 3 to 5 with the reference number 21.

Figure 6:
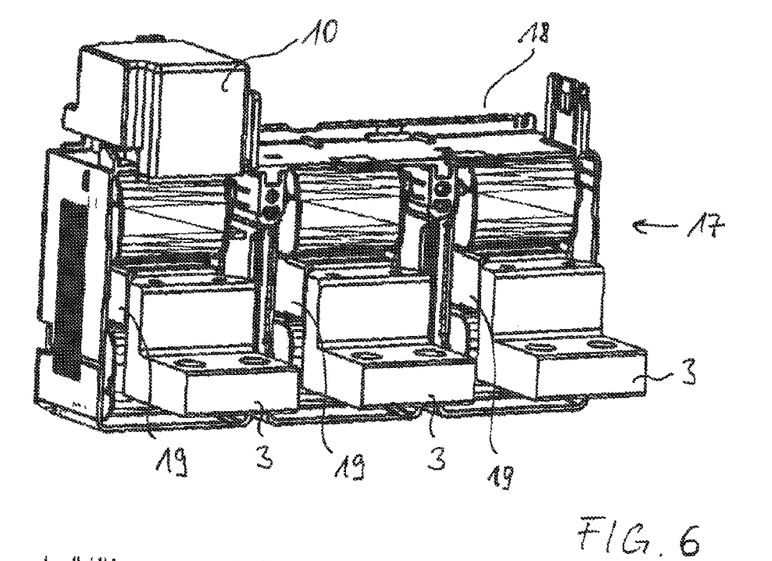
FIG. 6 shows a further embodiment of the circuit breaker according to the invention.
Figure 7:
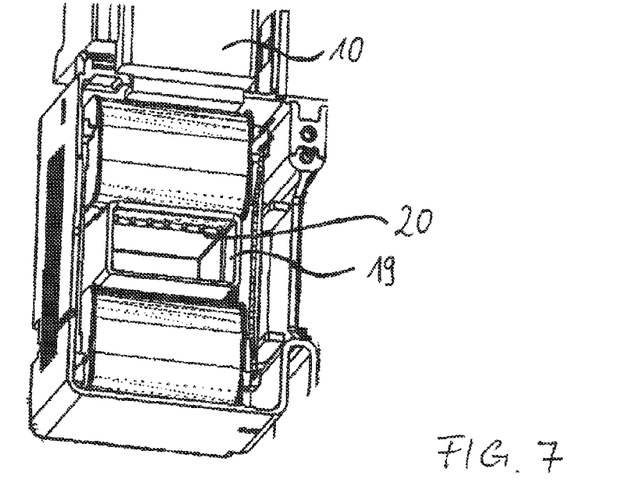
FIG. 7 shows a detail of the embodiment according to FIG. 6.

FIGS. 6 and 7 show a further embodiment of the circuit breaker according to the invention. In FIG. 6, the converter 17 is shown without the circuit-breaker housing 1. A receptacle 18 is disposed for inserting the electronics module 2. In addition, to improve clarity, a potting compound is not shown so that slots 19 are visible, through which the primary conductors 3 are inserted. A spring-loaded comb contact 20 can be seen in the detailed view in FIG. 7, which does not also show the primary conductor 3. The contact is permanently made when the primary conductor 3 is fitted in the converter 17. In the embodiment shown, the adapters 4 comprising the printed circuit boards 12 and the voltage dividers 14 for reducing the voltage are located in an adapter assembly housing 10 and are connected to the spring-loaded comb contacts 20 via conductor tracks (not shown).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE NUMERALS 1 circuit-breaker housing
2 switch electronics unit, electronics module
3 primary conductor
4 adapter
5 adapter cover
6 fastening means
7 spring element, contact element
8 side wall
10 adapter assembly housing
12 printed circuit board
14 voltage divider
17 converter
18 receptacle
19 slot
20 leaf-spring arrangement, spring-loaded comb contact
21 contact to the electronics module
22 contact pins

The invention claimed is:

1. A circuit breaker, comprising:
a circuit-breaker housing including a side wall through which a primary conductor with a high voltage is fed into the circuit-breaker housing;
a switch electronics unit; and
an adapter assembly housing arranged in the side wall of the circuit-breaker housing, the adapter assembly housing accommodating at least one adapter, the adapter comprising:
a printed circuit board;
a spring element in contact with the primary conductor, the spring element being joined to the printed circuit board; and
a voltage divider that reduces a tapped high voltage from the primary conductor to a low voltage for use in the switch electronics unit, the voltage divider being arranged on the printed circuit board and between the spring element and a low-voltage contact that transmits the low voltage to the switch electronics unit,
wherein the spring element includes a plurality of leaf springs,
wherein the plurality of leaf springs are arranged in a receiving opening for the primary conductor.

2. The circuit breaker of claim 1, wherein the voltage divider is connected to the spring element via a conductor track.

3. A circuit breaker, comprising:
a circuit-breaker housing including a side wall through which a primary conductor with a high voltage is fed into the circuit-breaker housing;
a switch electronics unit; and
an adapter assembly housing arranged in the side wall of the circuit-breaker housing, the adapter assembly housing accommodating at least one adapter, the adapter comprising:
a printed circuit board;
a spring element in contact with the primary conductor, the spring element being joined to the printed circuit board; and
a voltage divider that reduces a tapped high voltage from the primary conductor to a low voltage for use in the switch electronics unit, the voltage divider being arranged on the printed circuit board and between the spring element and a low-voltage contact that transmits the low voltage to the switch electronics unit,
wherein the spring element includes a coil spring,
wherein the coil spring arranged in a receiving opening for the primary conductor.

4. A circuit breaker, comprising:
a circuit-breaker housing including a side wall through which a primary conductor with a high voltage is fed into the circuit-breaker housing;
a switch electronics unit; and
an adapter assembly housing arranged in the side wall of the circuit-breaker housing, the adapter assembly housing accommodating at least one adapter, the adapter comprising:
a printed circuit board;
a spring element in contact with the primary conductor, the spring element being joined to the printed circuit board; and
a voltage divider that reduces a tapped high voltage from the primary conductor to a low voltage for use in the switch electronics unit, the voltage divider being arranged on the printed circuit board and between the spring element and a low-voltage contact that transmits the low voltage to the switch electronics unit,
wherein the spring element includes a leaf spring,
wherein the leaf spring is arranged in a receiving opening for the primary conductor.

5. A circuit breaker, comprising:
a circuit-breaker housing including a side wall through which a primary conductor with a high voltage is fed into the circuit-breaker housing;
a switch electronics unit; and
an adapter assembly housing arranged in the side wall of the circuit-breaker housing, the adapter assembly housing accommodating at least one adapter, the adapter comprising:
a printed circuit board;
a spring element in contact with the primary conductor, the spring element being joined to the printed circuit board; and
a voltage divider that reduces a tapped high voltage from the primary conductor to a low voltage for use in the switch electronics unit, the voltage divider being arranged on the printed circuit board and between the spring element and a low-voltage contact that transmits the low voltage to the switch electronics unit, wherein the spring element includes a spring-loadable telescopic arrangement, wherein the spring-loadable telescopic arrangement is arranged in a receiving opening for the primary conductor.

6. The circuit breaker of claim 1, wherein the receiving opening for the primary conductor is arranged in a converter block.

7. The circuit breaker of claim 1, wherein the circuit breaker is configured such that a contact between the leaf springs of the spring element and the primary conductor can be made when the primary conductor is provided.

8. The circuit breaker of claim 1, configured as a multi-pole circuit breaker, wherein a plurality of primary conductors are assigned a corresponding number of contacts for tapping the voltage.

9. The circuit breaker of claim 8, comprising a plurality of printed circuit boards arranged in the adapter assembly housing, wherein the printed circuit board is one of the plurality of printed circuit boards.

* * * * *